No. 744,339. Patented November 17, 1903.

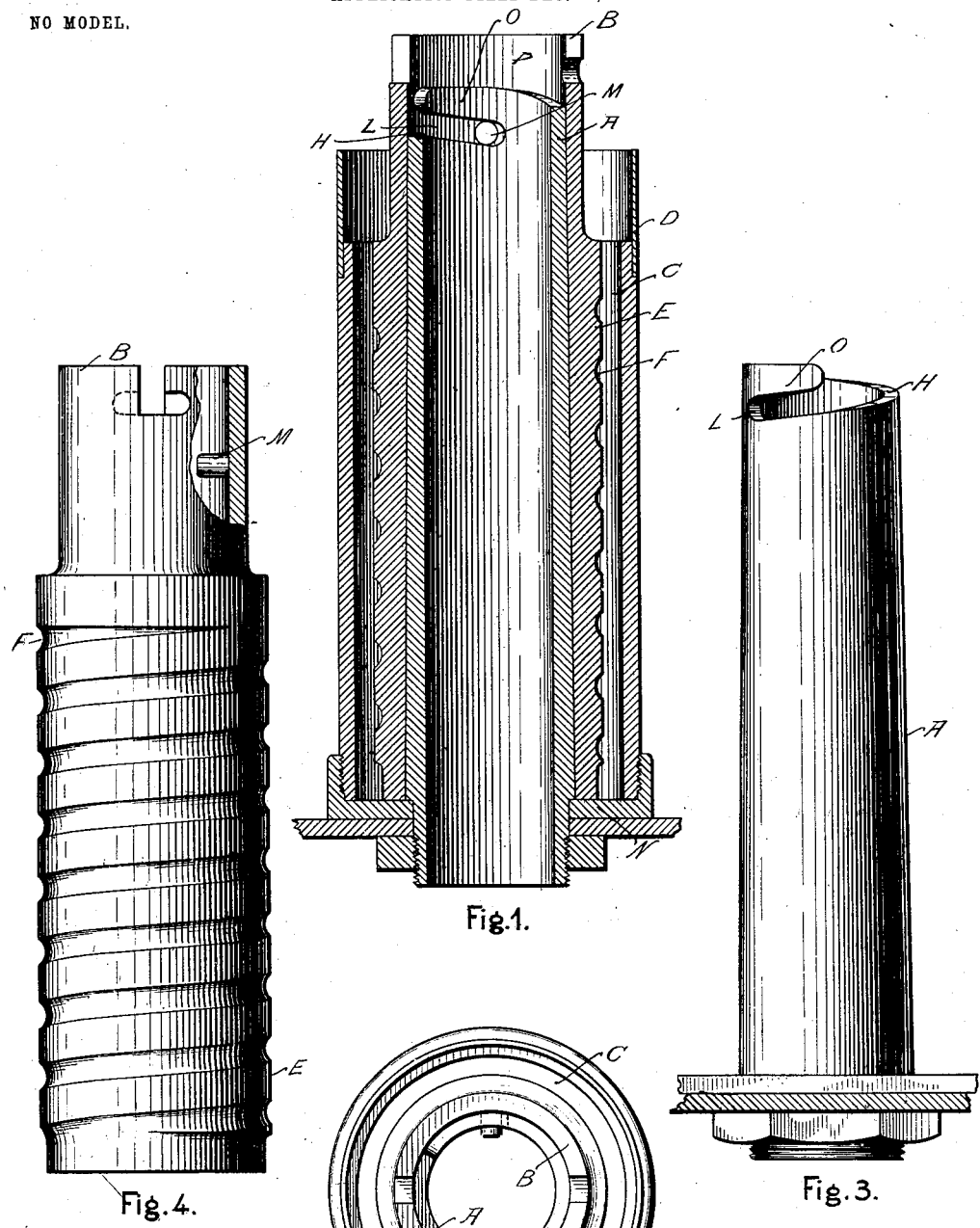

UNITED STATES PATENT OFFICE.

ANDREW HAUG, OF WEST ORANGE, NEW JERSEY, ASSIGNOR OF ONE-HALF TO EDWARD F. LEEDS, OF NEW YORK, N. Y.

APPARATUS FOR THE MANUFACTURE OF PHONOGRAPH-CYLINDERS.

SPECIFICATION forming part of Letters Patent No. 744,339, dated November 17, 1903.

Application filed December 22, 1902. Serial No. 136,099. (No model.)

*To all whom it may concern:*

Be it known that I, ANDREW HAUG, a citizen of the United States, residing at West Orange, in the county of Essex and State of New Jersey, have invented new and useful Improvements in Apparatus for the Manufacture of Phonograph-Cylinders, of which the following is a specification.

This invention relates to apparatus for the manufacture by molding of phonograph-cylinders either with or without a sound-record thereon.

According to my invention the apparatus is so constructed that the molded phonograph-cylinder can be extracted more easily from the mold and without danger of breaking or injuring the molded cylinder.

My invention is illustrated by the accompanying drawings, which form part of this specification.

Figure 1 represents a vertical section of a mold embodying my invention. Fig. 2 represents a top view of the mold shown in Fig. 1. Fig. 3 represents the inner tube of the mold shown in Fig. 1, and Fig. 4 represents the core of the mold shown in Fig. 1.

The inner tube A of the mold tapers on the outside, as shown in Figs. 3 and 1, toward the top. The core of the bore B correspondingly tapers, so that when the core B is placed in position over the inner tube A, as shown in Fig. 1, the core B fits close upon the inner tube A.

C is the matrix or cavity of the mold shown in Fig. 1, into which the molten material projects from the bore of the core B of the mold. As shown in Figs. 1 and 3, the socket L is so constructed that the pin M rises or falls as it travels out of or into the socket L, thereby causing the core B of the mold, to which the pin M is affixed, to rise or to fall with the pin M.

It will be understood, of course, that if the molded phonograph-cylinder is to be provided during the process of molding with a sound-record the outer surface D of the matrix C may be provided with a metallic negative of the sound-record which it is desired to mold upon the surface of the cylinder.

In adjusting the mold preparatory to molding the phonograph-cylinder the core B of the mold is placed upon the inner tube A and the pin M is moved into and securely locked by the socket L, as shown in Fig. 1. As the pin M moves into the socket L the pin M is forced downward by the upper side O of the socket L and carries downward with it the core B, so that the core B is pressed and held tightly against the bottom N of the mold, as shown in Fig. 1. Since the inner tube A of the mold tapers on the outside and since the bore of the core B correspondingly tapers, the core B fits close upon the inner tube A when the pin M is locked in position in the socket L. By reason of this construction and adjustment the molten wax or material used for the molding of the cylinder is prevented from entering between the inner tube A and the core B when the molten material enters the matrix C of the mold. When the cylinder has been molded is preferably tapering toward the bottom. Hence as the core B revolves and rises within the molded cylinder in the process of extraction the core B soon becomes sufficiently separated from the parts of the bore of the molded cylinder to enable it to be entirely extracted with ease from the molded cylinder.

According to my invention and in the manner above described the core B of the mold can be extracted easily from the molded phonograph-cylinder without danger of breaking or injuring the cylinder. Since the inner tube A of the mold tapers on the outside and since the bore of the core B correspondingly tapers, the core B is readily freed and separated from the inner tube A as the core B revolves and rises in the process of extraction from the molded cylinder and is readily freed from any adhesion caused by wax or other material which while molten may have penetrated from the matrix C to a position between the inner tube A and the surface of the bore of the core B.

I claim as my invention—

1. In an apparatus for the manufacture by molding of phonograph-cylinders, the combination of the core of the mold provided with a spiral groove, a projection secured to the core, and a spiral guide for the projection in motion having the same pitch as the pitch of the spiral groove, substantially as described.

2. In an apparatus for the manufacture by molding of phonograph-cylinders, the combination of the core of the mold provided with a bore and with a spiral groove, a pin projecting from and secured to the bore of the core and a spiral guide for the pin in motion having the same pitch as the pitch of the spiral groove, substantially as described.

3. In an apparatus for the manufacture by molding of phonograph-cylinders, the combination of the core of the mold tapering on the outside and provided with a bore and with a spiral groove, a pin projecting from and secured to the bore of the core, and a spiral guide for the pin in motion having the same pitch as the pitch of the spiral groove, substantially as described.

4. In an apparatus for the manufacture by molding of phonograph-cylinders, the combination of the inner tube tapering on the outside, the core of the mold provided with a correspondingly-tapering bore, a pin projecting from and secured to the bore of the core and a socket upon the inner tube adapted to receive and lock the pin, substantially as described.

5. In an apparatus for the manufacture by molding of phonograph-cylinders, an inner tube provided with a spiral guide, substantially as described.

6. In an apparatus for the manufacture by molding of phonograph-cylinders, an inner tube provided with a spiral guide and socket, substantially as described.

In testimony whereof I have signed my name to this specification, this 20th day of December, 1902, in the presence of two subscribing witnesses.

ANDREW HAUG.

Witnesses:
 GRACE A. GRIMMOND,
 THOMAS P. DALTON.